(12) United States Patent
Dai et al.

(10) Patent No.: US 8,730,364 B2
(45) Date of Patent: May 20, 2014

(54) IMAGE SENSOR WITH PIPELINED COLUMN ANALOG-TO-DIGITAL CONVERTERS

(75) Inventors: Tiejun Dai, Santa Clara, CA (US); Rui Wang, San Jose, CA (US); Zhengyu Li, San Jose, CA (US); Joseph Yang, San Jose, CA (US); Min Qu, Sunnyvale, CA (US); Yaowu Mo, San Ramon, CA (US); Shaomin Ding, Fremont, CA (US); Guangbin Zhang, Cupertino, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 477 days.

(21) Appl. No.: 13/080,031

(22) Filed: Apr. 5, 2011

(65) Prior Publication Data

US 2012/0113306 A1 May 10, 2012

Related U.S. Application Data

(60) Provisional application No. 61/411,711, filed on Nov. 9, 2010.

(51) Int. Cl.
*H04N 5/335* (2011.01)
(52) U.S. Cl.
USPC .............................. 348/300; 348/294; 348/308
(58) Field of Classification Search
USPC ......... 348/308, 294, 272, 300, 301, 302, 241, 348/249, 222.1
See application file for complete search history.

(56) References Cited

U.S. PATENT DOCUMENTS

| 7,488,928 | B2* | 2/2009 | Krymski | 250/208.1 |
|---|---|---|---|---|
| 7,570,293 | B2 | 8/2009 | Nakamura | |
| 7,995,124 | B2* | 8/2011 | Dai | 348/300 |
| 8,462,240 | B2* | 6/2013 | Osawa et al. | 348/294 |
| 2003/0043089 | A1 | 3/2003 | Hanson et al. | |
| 2008/0180136 | A1 | 7/2008 | Wu et al. | |
| 2008/0258042 | A1* | 10/2008 | Krymski | 250/208.1 |
| 2009/0073274 | A1* | 3/2009 | Dai | 348/222.1 |

FOREIGN PATENT DOCUMENTS

TW 201032587 A 9/2010

OTHER PUBLICATIONS

TW Application No. 100119078; Office Action and Search Report issued Aug. 23, 2013, 17 pages.
Rudberg, M. K. "Calibration of Mismatch Errors in Time Interleaved ADCs," The $8^{th}$ IEEE International Conference on Electronics, Circuits and Systems, Sep. 2001, vol. 2, pp. 845-848.
TW Application No. 100119078; Second Office Action and Search Report, Jan. 22, 2014, 17 pages.

(Continued)

*Primary Examiner* — Ahmed A Berhan
(74) *Attorney, Agent, or Firm* — Blakely Sokoloff Taylor & Zafman LLP (57) ABSTRACT

An image sensor includes a plurality of pixel cells organized into rows and columns of a pixel array. A bit line is coupled to each of the pixel cells within a line of the pixel array. Readout circuitry is coupled to the bit line to readout the image data from the pixel cells within the line. The readout circuitry includes a line amplifier coupled to the bit line to amplify the image data and first and second sample and convert circuits coupled in parallel to an output of the line amplifier to reciprocally and contemporaneously sample the image data and convert the image data from analog values to digital values.

18 Claims, 8 Drawing Sheets

(56) References Cited

OTHER PUBLICATIONS

CN Application No. 201110375210.5; First Office Action and Search Report, Jan. 10, 2014, 26 pages.

Wu, Yan et al. "Simulation and Design of 8 bit CMOS Two Channel Pipeline ADC", Semiconductor Technology, vol. 35, No. 1, Jan. 2010, pp. 14-17.

* cited by examiner

FIG. 6 ic # IMAGE SENSOR WITH PIPELINED COLUMN ANALOG-TO-DIGITAL CONVERTERS

REFERENCE TO PRIOR APPLICATIONS

This application claims the benefit of U.S. Provisional Application No. 61/411,711, filed Nov. 9, 2010, hereby incorporated by reference.

TECHNICAL FIELD

This disclosure relates to image sensing devices, and more particularly, but not exclusively to readout circuitry of an image sensor.

BACKGROUND INFORMATION

Image sensors have become ubiquitous. They are widely used in digital still cameras, cellular phones, security cameras, medical devices, automobiles, and other applications. The technology used to manufacture image sensors, and in particular complementary metal-oxide semiconductor ("CMOS") image sensor ("CIS"), has continued to advance at a great pace. Modern image sensor applications place demands for faster processing speeds and better image quality, while simultaneously expecting miniaturization in the physical size of the image sensor. So new architectures need to be developed to improve the performance of image sensor circuits to keep place with these demands.

Figure 1A:
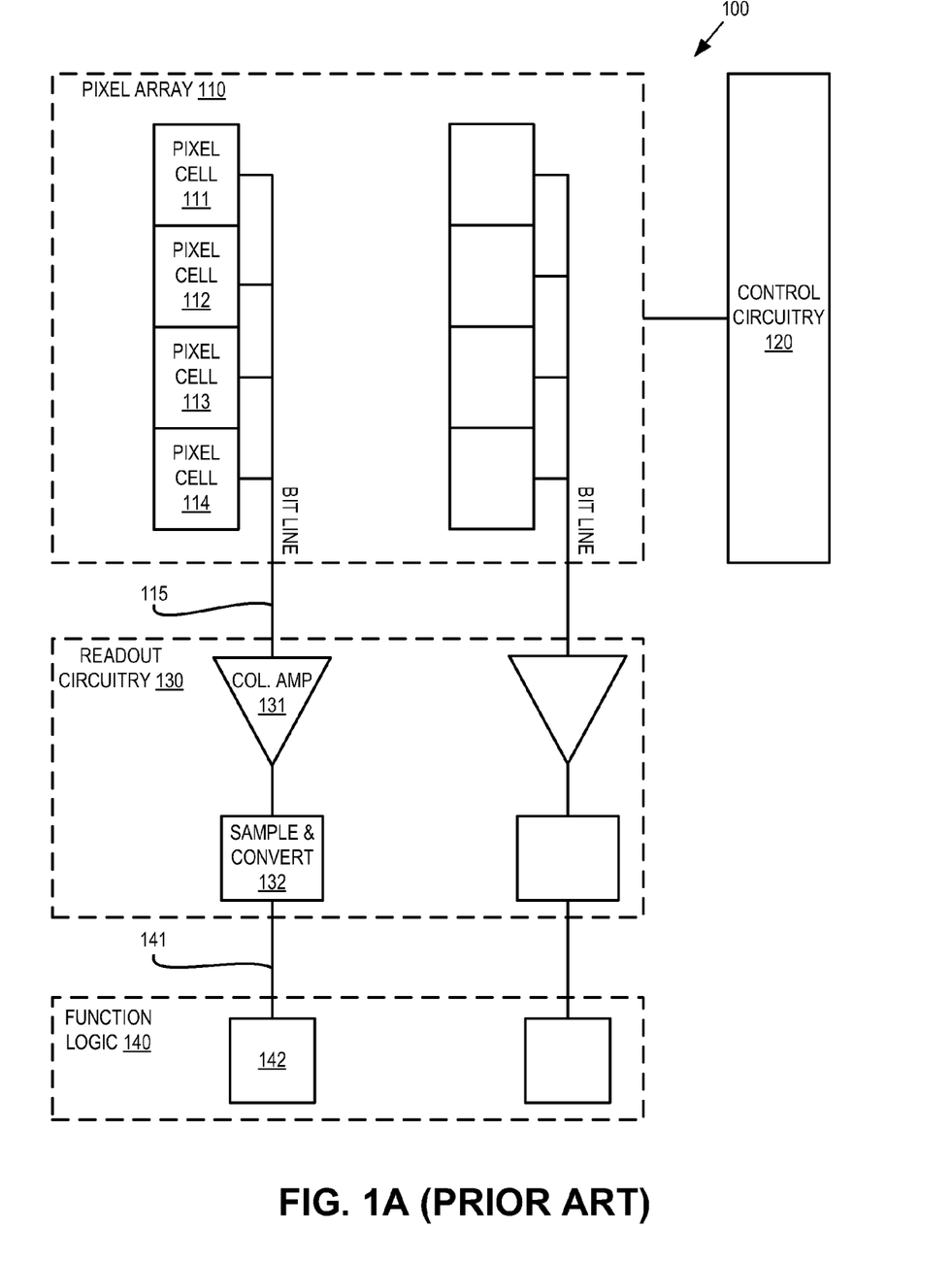
FIG. 1A (PRIOR ART) is a functional block diagram illustrating a conventional image sensor.

One option to improve performance of image sensor circuits is to improve the readout circuit for the pixel array of the image sensor. FIG. 1A is a functional block diagram illustrating an image sensor 100. Image sensor 100 includes a pixel array 110 including pixel cells 111, 112, 113 and 114, control circuitry 120, readout circuitry 130 and function logic 140. After each pixel has acquired its image data or image charge, the image data is read out to readout circuitry 130 via bit line 115. The image data from pixel cells 111, 112, 113 and 114 is readout via bit line 115 one at a time via a column amplifier 131 and then transferred to a sample and convert circuit 132. From there, it is coupled to function logic 140 via readout line 141. Function logic 140 may simply store the digital image data and/or manipulate the digital image data by applying post image effects (e.g., crop, rotate, remove red eye, adjust brightness, adjust control, or otherwise).

Figure 1B:
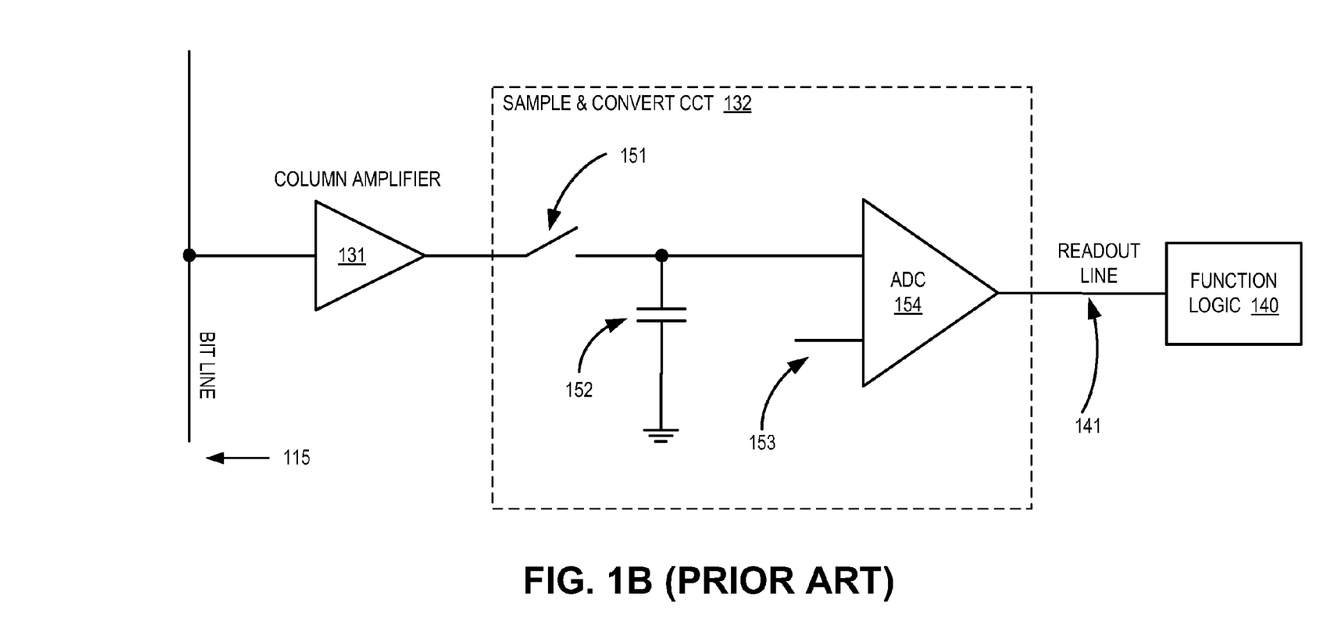
FIG. 1B (PRIOR ART) is a functional block diagram illustrating details of the readout circuitry of a conventional image sensor.
Figure 1C:
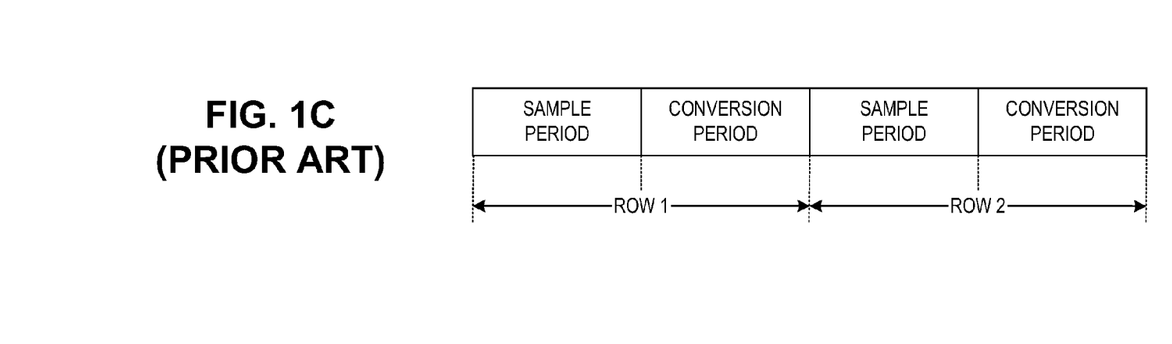
FIG. 1C (PRIOR ART) is a timing diagram illustrating the serialized nature of the readout circuitry of a conventional image sensor.

FIG. 1B is a functional block diagram illustrating greater detail of readout circuit 130. Bit line 115 couples pixel cells of a given column within pixel array 110 to column amplifier 131. Switch 151 selectively couples column amplifier 131 to sampling capacitor 152 and analog-to-digital converter ("ADC") 154. The output of ADC 154 is coupled to function logic 140 to store digital pixel values corresponding to digital pixel signals. In this readout architecture, separate sample and conversion periods are required to read out each pixel cell in the bit line. However, the sample and conversion periods are serialized, as illustrated in FIG. 1C. Since, column amplifier 131 and switch 151 are idle during the serialized conversion periods for each pixel cell row, the total readout speed of each column of pixel array 110 is limited.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of an image sensor array having readout circuit architecture with a decoupled pipeline ramp ADC to improve readout speed is described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 2:
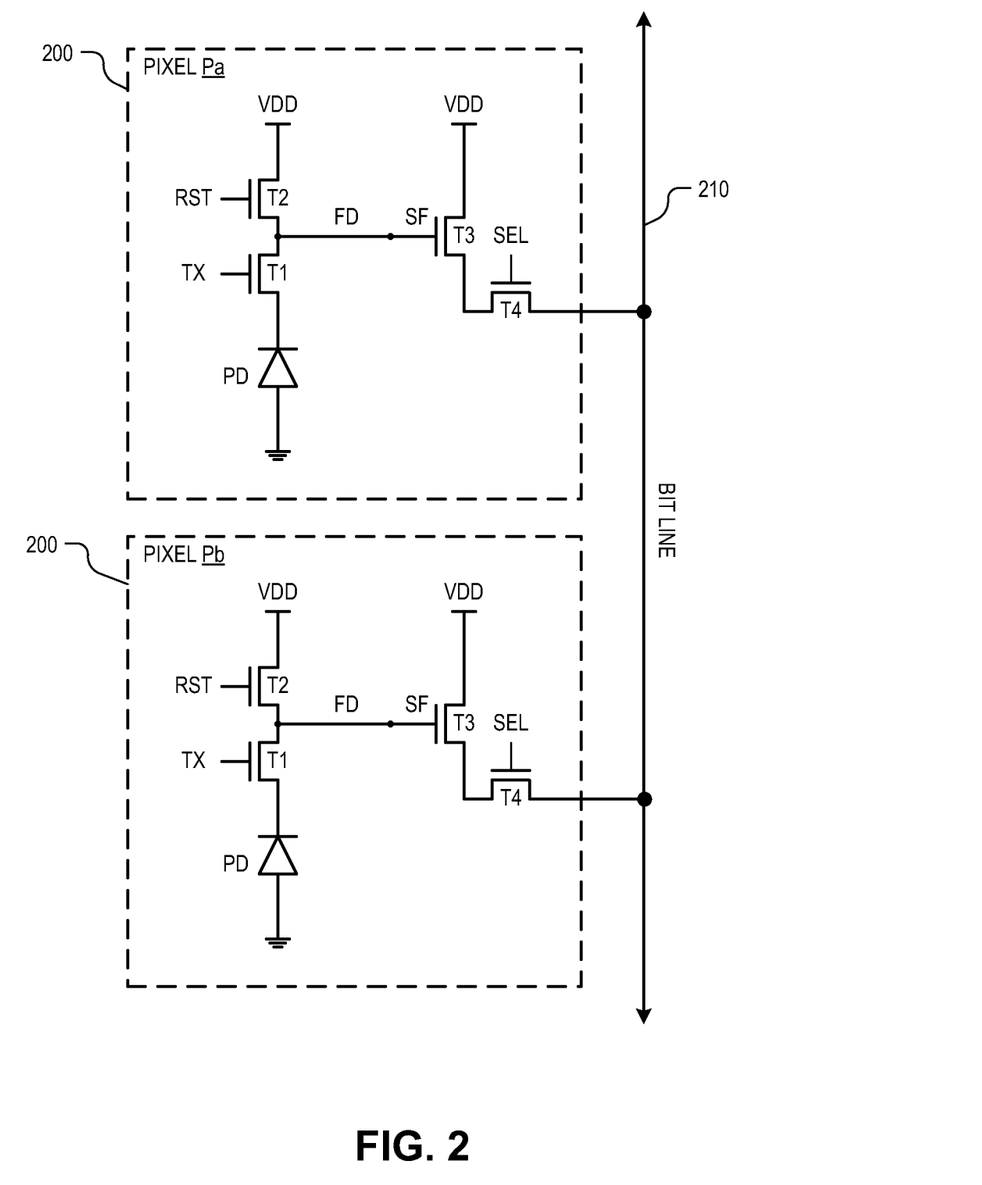
FIG. 2 is a circuit diagram illustrating pixel circuitry of two four-transistor (4T) pixels, in accordance with an embodiment of the invention.

FIG. 2 is a circuit diagram illustrating pixel circuitry 200 of two four-transistor ("4T") pixels within a pixel array, in accordance with an embodiment of the invention. However, it should be appreciated that embodiments of the present invention are not limited to 4T pixel architectures; rather, one of ordinary skill in the art having the benefit of the instant disclosure will understand that the present teachings are also applicable to 3T designs, 5T designs, and various other pixel architectures. In FIG. 2, pixels Pa and Pb are arranged in two rows and one column. The illustrated embodiment of each pixel circuitry 200 includes a photodiode PD, a transfer transistor T1, a reset transistor T2, a source-follower ("SF") transistor T3 and a select transistor T4. During operation, transfer transistor T1 receives a transfer signal TX, which transfers the charge accumulated in photodiode PD to a floating diffusion node FD. In one embodiment, floating diffusion node FD may be coupled to a storage capacitor (not shown) for temporarily storing image charges. Reset transistor T2 is coupled between a power rail VDD and the floating diffusion node FD to reset (e.g., discharge or charge the FD to a preset voltage) under control of a reset signal RST. The floating diffusion node FD is coupled to control the gate of SF transistor T3. SF transistor T3 is coupled between the power rail VDD and select transistor T4. SF transistor T3 operates as a source-follower providing a high impedance output from the pixel. Finally, select transistor T4 selectively couples the output of pixel circuitry 200 to bit line 210 under control of a select signal SEL.

Figure 3A:
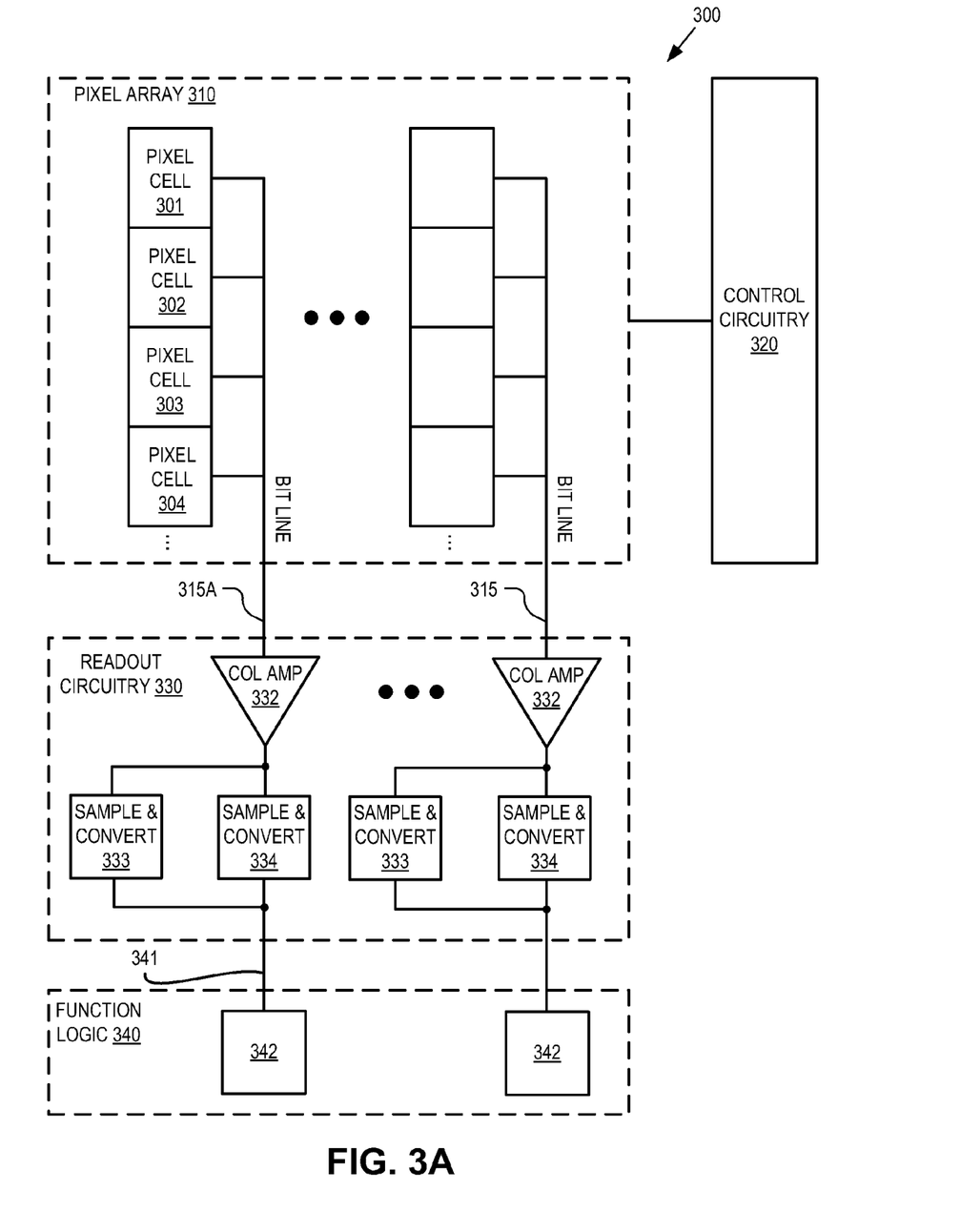
FIG. 3A is a functional block diagram illustrating an image sensor including readout circuitry having pipelined column ADCs, in accordance with an embodiment of the invention.

FIG. 3A is a functional block diagram illustrating an image sensor 300 including readout circuitry having pipelined column ADCs, in accordance with an embodiment of the invention. The illustrated embodiment of image sensor 300 includes a pixel array 310, control circuitry 320, bit lines 315, readout circuitry 330, readout lines 341, and function logic 340. The illustrated embodiment of readout circuitry 330 includes column amplifiers 332 and sample and convert circuits 333 and 334. The illustrated embodiment of function logic 340 includes memory buffers 342.

Pixel array 310 is a two-dimensional ("2D") array of an image sensor of pixels. In one embodiment, each pixel is a complementary metal-oxide-semiconductor ("CMOS") imaging pixel. As illustrated, each pixel is arranged into a row and a column to acquire image data of a person, place or object, which can then be used to render an image of the person, place or object. In the illustrated embodiment, only four rows and two columns of pixel cells are shown so as not to clutter the drawing. In reality, pixel array 310 may including, hundreds, thousands, or even millions of pixel cells, although only 8 pixels cells are shown. Pixel circuitry 200 of FIG. 2 is one possible pixel circuitry architecture for implementing each pixel cell within pixel array 310 of FIG. 3A.

After each pixel has acquired its image data or image charge, the image data is readout by readout circuitry 330 via bit line 315. Image data from pixel cells 301, 302, 303 and 304 are read out via bit line 315A one at a time to column amplifier 332 and then transferred to sample and convert circuits 333 or 334. In this embodiment, column amplifier 332 has less idle time, since it can continuously sample data from pixel cells 301-304 and feed it in an alternating manner to sample & convert circuits 333 and 334. In other words, the sampling circuitry and conversion circuitry within each pipeline leg of sample and convert circuits 333 and 334 is replicated providing two parallel pipeline stages for converting analog image data to digital image data.

Control circuitry 320 is coupled to pixel array 310 to control operational characteristic of pixel array 310. For example, control circuitry 320 may generate a shutter signal for controlling image acquisition. In one embodiment, the shutter signal is a global shutter signal for simultaneously enabling all pixels within pixel array 310 to simultaneously capture their respective image data during a single acquisition window. In an alternative embodiment, the shutter signal is a rolling shutter signal whereby each row, column, or group of pixels is sequentially enabled during consecutive acquisition windows. Furthermore, control circuitry 320 may be responsible for generating the SEL signal to select which row of pixel cells are to be readout along bit lines 315 at a given time. Although FIG. 3A illustrates bit lines 315 as coupling to pixel cells within a given column, embodiments of the present invention are applicable to a row readout configuration or another line readout configuration and column amplifier 332 may be generically referred to as a line amplifier.

Figure 3B:
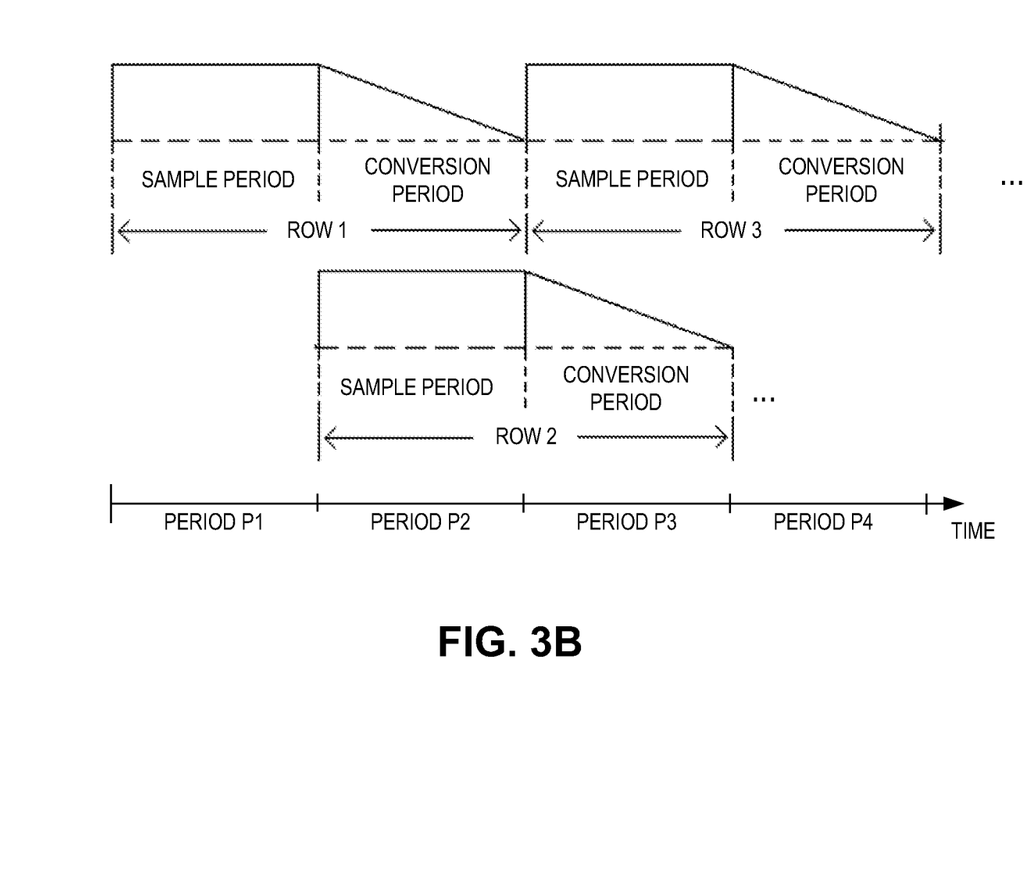
FIG. 3B is a timing diagram illustrating the parallel nature of readout circuitry having pipelined column ADCs, in accordance with an embodiment of the invention.

FIG. 3B is a timing diagram illustrating the parallel nature of readout circuitry having pipelined column ADCs, in accordance with an embodiment of the invention. As illustrated, during sample period P1, first pixel data is sampled from a first pixel cell (e.g., pixel cell 301) and buffered or "held" by sample and convert circuit 333. Next, during period P2, this first pixel data is converted by sample and convert circuit 333 to a digital value. However, during this same period P2, second pixel data is sampled from a second pixel cell (e.g., pixel cell 302) and held by sample and convert circuit 334. Thus, during period P2, sample and convert circuit 333 is having a conversion period while sample and convert circuit 334 is time sharing column amplifier 332 and bit line 315A to execute a sample period. During period P3, the roles reverse and sample and convert circuit 333 time shares column amplifier 332 and bit line 315A for a sample period of the next pixel cell row (e.g., pixel cell 303), while sample and convert circuit 334 converts the image data from the previous pixel cell row (e.g., pixel cell 302).

Figure 4:
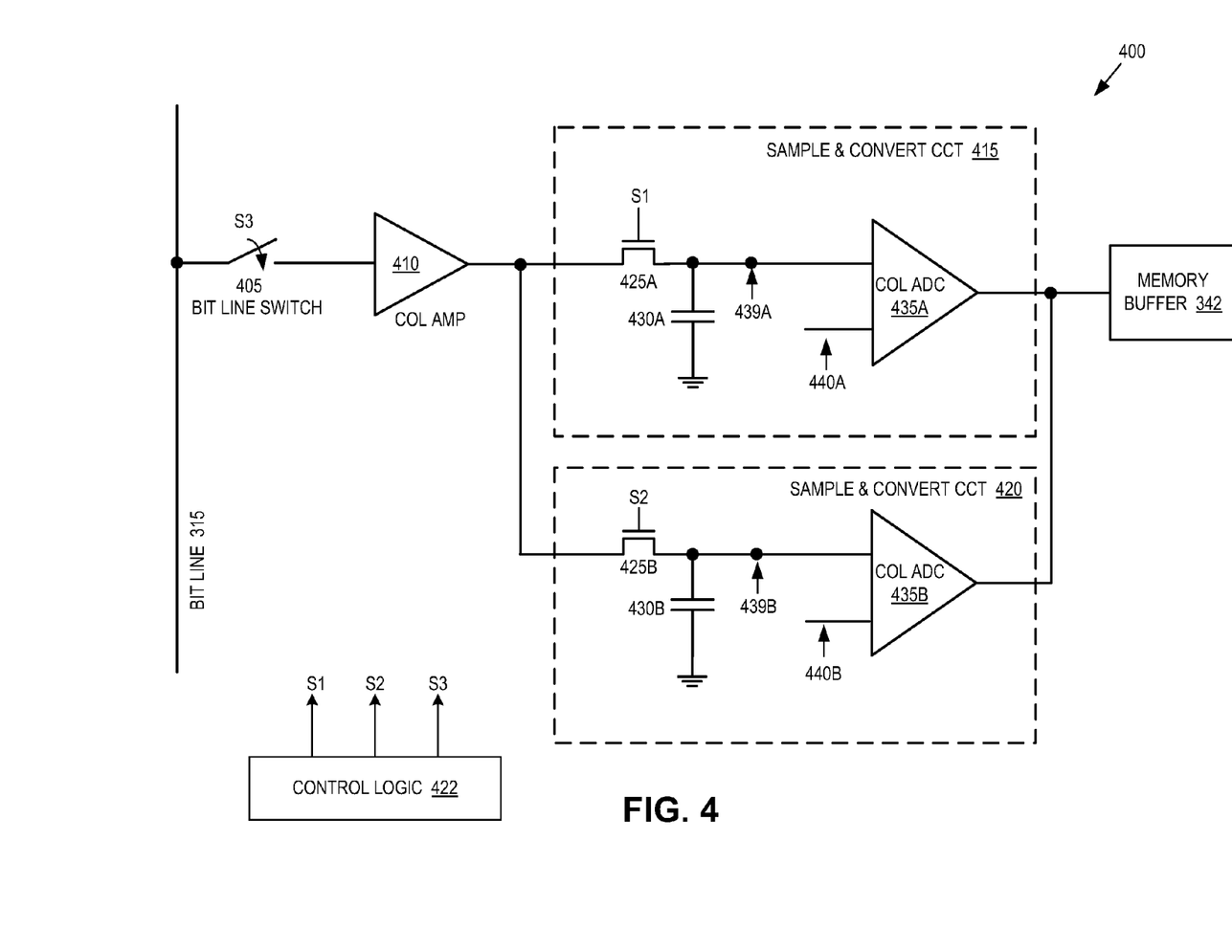
FIG. 4 is a diagram illustrating readout circuitry having pipelined column ADCs, in accordance with an embodiment of the invention.

FIG. 4 is a diagram illustrating readout circuitry 400 having pipelined column ADCs, in accordance with an embodiment of the invention. Readout circuitry 400 represents one possible implementation of readout circuitry 330 illustrated in FIG. 3A. It should be appreciated that readout circuitry 400 only represents one instance of the circuitry that is repeated for each bit line coming from pixel array 310. The illustrated embodiment of readout circuitry 400 includes a bit line switch 405, a column amplifier 410, two sample and convert circuits 415 and 420, and control logic 422 for generating control signals S1, S2, and S3. The illustrated embodiment of sample and convert circuits 415 and 420 each include a sample switch 425, a sample capacitor 430, and a column ADC 435. The components associated with sample and convert circuit 415 are labeled with the letter 'A' following their number while the components associated with sample and convert circuit 420 are labeled with the letter 'B' following their number. In one embodiment, sample and convert circuits 415 and 420 are each capable of correlated double sampling. In these embodiments, each sample and convert circuit 415 may include an additional sampling switch and sampling capacitor (not illustrated) to hold the black reference signal as well as the image data signal for offset prior to conversion by column ADC 435.

Bit line switch 405, controlled by control signal S3, selectively couples bit line 315 to column amplifier 410. Between samplings of bit line 315, bit line switch 405 is open circuited to decouple the particular leg or portion of readout circuitry 330 from its associated bit line 315. During a first sampling period (e.g., period P1 in FIG. 3B), bit line switch 405 is close circuited, coupling pixel cell 301 to column amplifier 410 via bit line 315. After column amplifier 410 amplifies the analog image data from pixel cell 301, sampling switch 425A is close circuited by assertion of control signal S1, coupling the amplified analog image data from pixel cell 301 to sampling capacitor 430A. After the image data from pixel cell 301 is sampled onto sampling capacitor 430A, sampling switch 425A is open circuited via de-assertion of control signal S1. During a second sampling period (e.g., period P2), bit line switch 405 is close circuited via control signal S3, coupling pixel cell 302 to column amplifier 410 via bit line 315. After column amplifier 410 amplifies the analog image data from pixel cell 302, sampling switch 425B is close circuited via control signal S2, coupling the amplified image data from pixel 302 to sampling capacitor 430B. After the data from pixel cell 302 is sampled into sampling capacitor 430B, sampling switch 425B is again open circuited. The operation of bit line switch 405 provides noise reduction by decoupling the sample and convert circuits from the bit lines between sample cycles (e.g., see signal trace S3 is de-asserted between sampling instances in FIG. 6).

During a first conversion period (e.g., period P2 in FIG. 3B)), which occurs contemporaneously with the second sampling period, the sampled image data from pixel cell 301 held in sampling capacitor 430A is compared to a reference signal 440A by column ADC 435A. In one embodiment, column ADCs 435 are ramp ADCs and reference signals 440 are ramp signals. Once column ADC 440A completes the analog-to-digital conversion, the resultant digital image data is transferred to memory buffer 342, which is part of function logic 340.

During a third sampling period (e.g., period P3 in FIG. 3B), pixel cell 303 is coupled to column amplifier 410 through bit line 315 and bit line switch 405. After column amplifier 410 amplifies the analog image data from pixel cell 303, sampling switch 425A is close circuited, coupling the amplified image data from pixel 303 to sampling capacitor 430A. After the data from pixel cell 303 is sampled and held by sampling capacitor 430A, sampling switch 425A is open circuited. During a second conversion period (e.g., period P3), which is contemporaneous with the third sampling period, the sampled image data from pixel cell 302 currently held in sampling capacitor 430B is compared to reference signal 440B by column ADC 435B. Once column ADC 435B completes the analog-to-digital conversion, the resultant digital image data is transferred to memory buffer 342. This continues until the entire column or line of pixel cells in pixel array 310 are sampled and converted to digital image data. Besides the first sampling period and a last conversion period of each pixel cell column, sampling periods and conversion periods occur concurrently.

Figure 5:
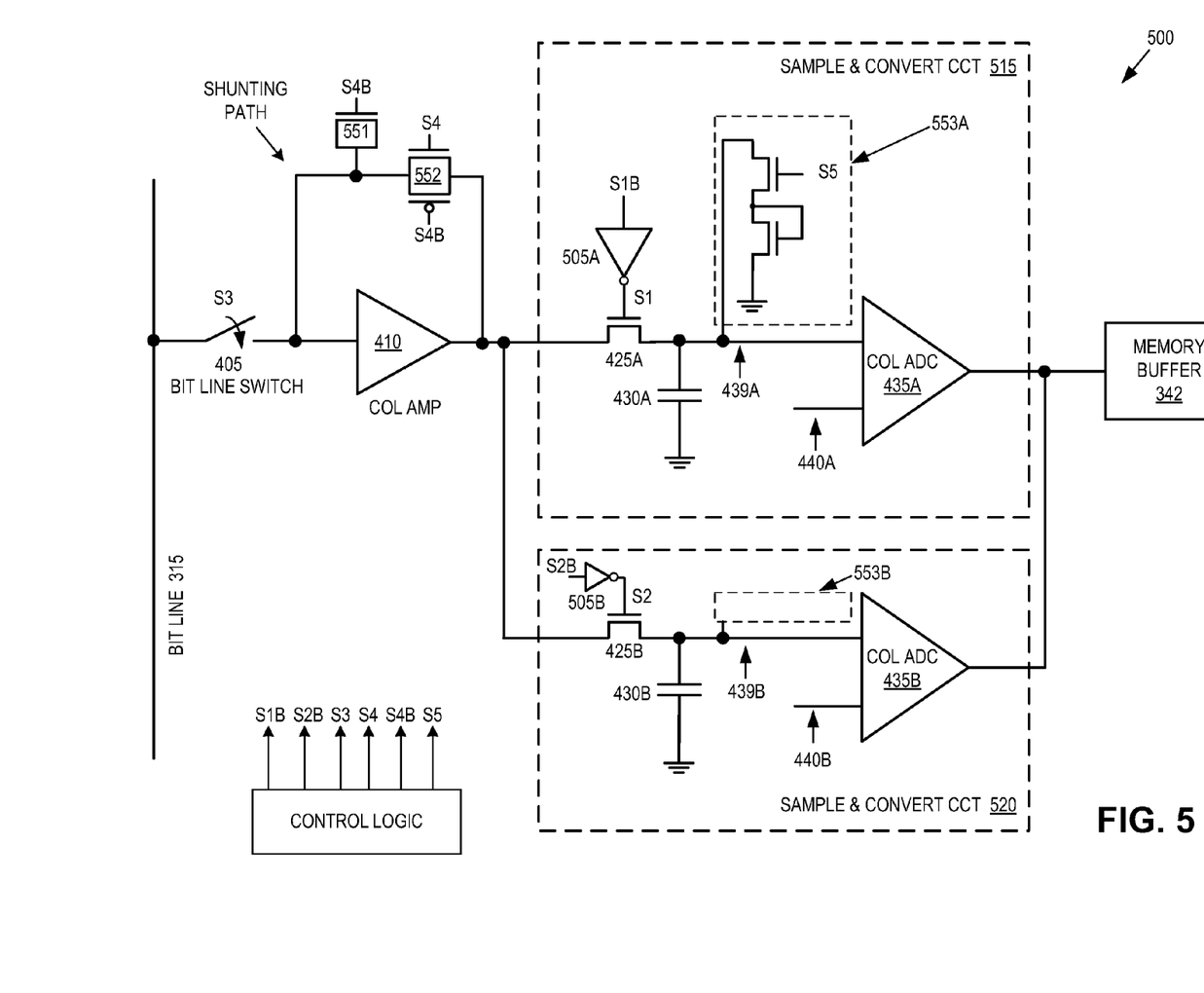
FIG. 5 is a diagram illustrating readout circuitry having pipelined column ADCs and improved noise resistance features, in accordance with an embodiment of the invention.

FIG. 5 is a diagram illustrating readout circuitry 500 having pipelined column ADCs and improved noise resistance features, in accordance with an embodiment of the invention. Readout circuitry 500 is similar to readout circuitry 400 with the below identified differences to improve noise resistance.

Figure 6:
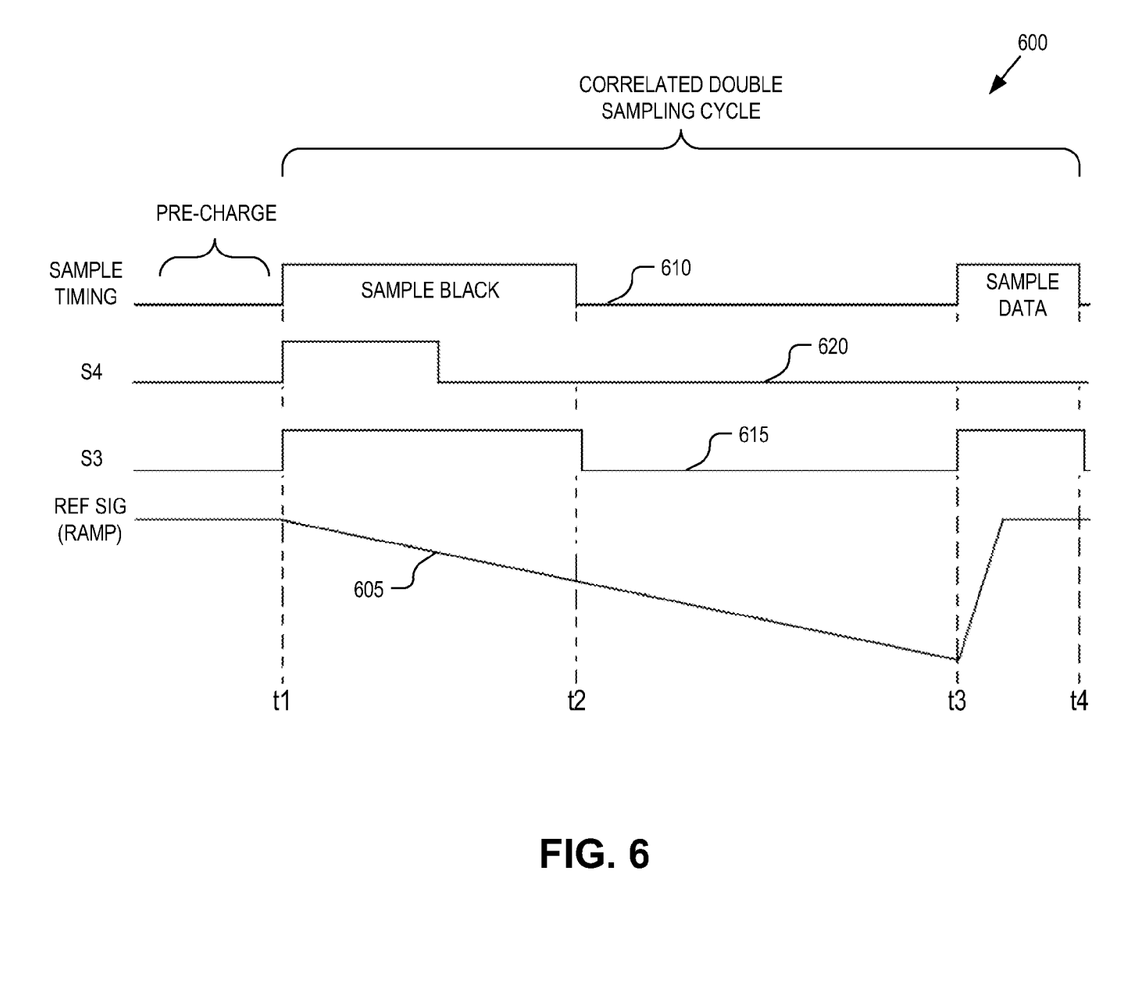
FIG. 6 is a timing diagram illustrating operation of the readout circuitry, in accordance with an embodiment of the invention.

For example, a shunting path may be used to couple the output of column amplifier 410 to its input. This shunting path may include a NMOS capacitor 551 coupled to the input of column amplifier 410. In one embodiment, NMOS capacitor 551 is implemented by coupling the source and drain of an NMOS transistor together and to the input of column amplifier 410 along the shunting path. The gate of the NMOS capacitor 551 is then coupled to a control signal S4B (complement of S4). In one embodiment, the shunting path may include a transmission gate 552 coupled in series between the input and output of column amplifier 410 and controlled by control signal S4 and its complement S4B. In one embodiment, transmission gate 552 includes back-to-back coupled PMOS and NMOS transistors, which have their source and drains coupled to each other and then coupled in series with the shunting path. NMOS capacitor 551, transmission gate 552, and control signals S4 and S4B equalize bit line amplifier 410 at the beginning of each sampling period. In various embodiments, the shunting path may be implemented without NMOS capacitor 551, without transmission gate 552, transmission gate 552 may be implemented with only one of the PMOS or the NMOS transistor half of transmission gate 552, or both transmission gate 552 and NMOS capacitor 551 may be implemented together as illustrated. In an embodiment where NMOS capacitor 551 is included within the shunting path without transmission gate 552, a series coupled switch (e.g., one of the PMOS transistor controlled by S4B or the NMOS transistor controlled by S4) is inserted into the shunting path. FIG. 6 illustrates how S4 is asserted once per correlated double sampling period. As illustrated, S4 is asserted briefly at the beginning of sampling a black reference signal (used for offsetting the data signal) and is not asserted during the sampling of the data signal itself for a given pixel cell. NMOS capacitor 551 and transmission gate 552 compensate for clock feed-through and decrease charge injection to reduce ripple and offset at the output of bit line amplifier 410.

In addition to NMOS capacitor 551 and transmission gate 552 other elements such as pre-charge circuits 553A and 553B reduce cross coupling between adjacent pipeline legs of sample and convert circuits 515 and 520. Pre-charge circuits 553A and 353B pre-charge sampling nodes 439A and 439B, respectively, before each correlated double sampling cycle (see FIG. 6). Pre-charging the sampling nodes at the beginning of a sampling cycle eliminates a memory effect between sampling cycles and reduces cross-coupling between the pipeline legs. In the case of correlated double sampling, sampling nodes 439 are pre-charged only once for a combined sample black and sample data cycle. In the illustrated embodiment, pre-charge circuits 553 each include two transistors coupled in series between sampling nodes 439 and a voltage reference (e.g., ground). The first series coupled transistor has its gate clamped to its drain and the gate of the second series coupled transistor is controlled via control signal S5.

In one embodiment, sampling switches 425 can be operated in a manner to further reduce cross-coupling between sample and convert circuits 515 and 520. For example, in one embodiment, control signals S1 and S2 are offset or time shifted relative to each other to prevent the occurrence of both sampling branches being turned on at the same time. Drivers 505A and 505B are coupled to the gates of sampling switches 425A and 425B, respectively, to provide strong gating to further suppress noise. In the illustrated embodiment, drivers 505A and 505B are implemented with inverter circuits and driven with control signal complements S1B and S2B. In one embodiment, sampling switches 425A and 425B are purposefully reduced in size to reduce their associated parasitic capacitances. This reduces their capacitive contribution relative to the capacitance of sample capacitors 430A and 430B thereby further reducing parasitic noise. In one embodiment, sampling switches 425A and 425B are smaller than bit line switch 405.

Other fabrication techniques may also be used to reduce cross coupling between the sampling branches. For example, layout separation and metal shielding may be used to isolate and shield cross noise pollution between the sampling branches (e.g., between sample and convert circuits 415 and 420 or between sample and convert circuits 515 and 520).

FIG. 6 is a timing diagram 600 illustrating correlated double sampling operation of readout circuitry 330 using a ramp-type column ADC 435, in accordance with an embodiment of the invention. Timing diagram 600 illustrates how one sample and convert circuit (e.g., sample and convert circuit 333) calculates the analog-to-digital conversion of image data (trace 605 between time t1 and t3) contemporaneously with the other sample and convert circuit (e.g., sample and convert circuit 334) performing a correlated double sampling of a black reference value and the image data value from a given pixel cell (trace 610). Trace 605 illustrates a ramp reference signal embodiment. During operation, the ramp reference signal slowly decreases (or rises) while a counter measures time or clock cycles. When the voltage of the sampled image data matches the ramp reference signal, the counter value is referenced for the analog-to-digital conversion. Trace 615 illustrates how bit line switch 405 decouples the sample and convert circuit when not sampling a black reference signal or an image data signal. Trace 620 illustrates how NMOS capacitor 551 and transmission gate 552 are operated to reduce noise.

The above illustrated embodiments increase the column readout speed of the image sensor by using one column amplifier, two sampling circuits (e.g., combination of sample switch and sample capacitor), two column ADCs, and one memory block. However, alternative embodiments could sacrifice column readout speed for silicon area by sharing one sampling circuit, two column ADCs and one memory block between two columns of the pixel array. The column readout speed of this embodiment would be substantially the same as in the image sensor seen in FIG. 1A, but would decrease the size of the image sensor.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize. For example, readout circuitry 330 is shown at the "bottom" of FIG. 3A for convenience purposes; however, readout circuitry 330 may be placed in a variety of locations on an integrated circuit die relative to pixel array 310.

Modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An image sensor, comprising:
a pixel array including a plurality of pixel cells organized into rows and columns for capturing image data;
a bit line coupled to each of the pixel cells within a line of the pixel array; and
readout circuitry coupled to the bit line to readout the image data from the pixel cells within the line of the pixel array, the readout circuitry including:
a line amplifier to amplify the image data and having an input coupled to the bit line and an output; and
a first and second sample and convert circuits coupled in parallel to the output of the line amplifier to reciprocally sample the image data and convert the image data from analog values to digital values, wherein the first sample and convert circuit is configured to contemporaneously sample first image data while the second sample and convert circuit converts second image data and the second sample and convert circuit is configured to contemporaneously sample third image data while the first sample and convert circuit converts the first image data,
wherein the line of the pixel array comprises a given column and the line amplifier comprises a column amplifier, wherein a bit line switch is coupled between the bit line and the column amplifier of the image sensor, the bit line switch coupled to control logic to selectively disconnect the column amplifier from the bit line when not sampling data.

2. The image sensor of claim 1, further comprising a memory buffer coupled to be time shared by both the first and second sample and convert circuits to output the digital values.

3. The image sensor of claim 1, wherein each of the first and second sample and convert circuits includes:

a sampling switch having a first terminal coupled to the output of the column amplifier and a second terminal coupled to a sampling node;
a sampling capacitor coupled to the sampling node to sample and hold the image data; and
a column analog-to-digital converter ("ADC") coupled to the sampling node.

4. The image sensor of claim 3, wherein the column ADC comprises a ramp ADC.

5. The image sensor of claim 3, wherein each of the first and second sample and convert circuits includes:
a pre-charge circuit coupled to the sampling node to pre-charge the sampling node to a fixed voltage, the pre-charge circuit coupled to control logic to selectively pre-charge the sampling node before each sampling period.

6. The image sensor of claim 3, wherein each of the first and second sample and convert circuits includes:
a driver circuit coupled to drive a gate of the sample switch.

7. The image sensor of claim 6, wherein the sample switch is smaller than the bit line switch.

8. The image sensor of claim 1, further comprising a shunting path coupling the input of the column amplifier to the output of the column amplifier, the shunting path including an NMOS capacitor having its source and drain coupled together and coupled to the input of the column amplifier and a switch coupled in series with the shunting path between the input and the output of the column amplifier.

9. The image sensor of claim 1, further comprising a shunting path coupling the input of the column amplifier to the output of the column amplifier, the shunting path including a transmission gate coupled in series within the shunting path, wherein the shunting path comprises back-to-back coupled PMOS and NMOS transistors.

10. A method of reading out image data from a pixel array including a plurality of pixel cells organized into rows and columns for capturing the image data, the method comprising:
sampling first image data from a bit line coupled to each of the pixel cells within a line of the pixel array during a first sampling period, the first image data generated by a first pixel cell coupled to the bit line;
converting the first image data from an analog value to a digital value during a first conversion period subsequent to the first sampling period;
sampling second image data from the bit line during a second sampling period, the second image data generated by a second pixel cell coupled to the bit line, wherein the second sampling period occurs during the first conversion period;
amplifying the first and second image data with a line amplifier coupled to the bit line, wherein sampling the second image data occurs contemporaneously with converting the first image data by time sharing the line amplifier between two sample and convert circuits each including an independent analog-to-digital converter; and
disconnecting the line amplifier from the bit line, with a switch coupled between the line amplifier and the bit line, when not sampling image data from one of the pixel cells coupled to the bit line.

11. The method of claim 10, further comprising:
converting the second image data from a second analog value to a second digital value during a second conversion period subsequent to the second sampling period; and time sharing a single memory buffer between the independent analog-to-digital converters to sequentially output digital values associated with the image data generated by the pixel cells coupled to the bit line.

12. The method of claim 11, further comprising:
pre-charging a sampling node coupled to the independent analog-to-digital converter and a sampling capacitor within one of the sample and convert circuits prior to the first sampling period.

13. The method of claim 12, further comprising:
controlling a sample switch coupled between the sampling capacitor and the line amplifier with an inverter.

14. The method of claim 11, further comprising:
offsetting an assertion of a first control signal that controls a first sampling switch of one of the sample and convert circuits from the de-assertion of a second control signal that control a second sampling switch in the other one of the sample and convert circuits so that the first and second sampling switches are not simultaneously on, wherein the first and second sampling switches are coupled between the line amplifier and respective sampling capacitors.

15. The method of claim 10, further comprising: deasserting a control signal applied to a gate of a NMOS capacitor having its source and drain coupled together and coupled to an input of the line amplifier at a beginning of the first sample period to reduce noise.

16. The method of claim 10, further comprising: asserting a control signal applied to a gate of a transmission gate coupled in series between an input and an output of the line amplifier at a beginning of the first sample period to reduce noise.

17. The method of claim 10, wherein the pixel array comprises a CMOS pixel array, the line comprises a column, the line amplifier comprises a column amplifier, and the independent analog-to-digital converter comprises a ramp analog-to-digital converter.

18. An image sensor, comprising: a pixel array including a plurality of pixel cells organized into rows and columns for capturing image data;
a bit line coupled to each of the pixel cells within a line of the pixel array; and
readout circuitry coupled to the bit line to readout the image data from the pixel cells within the line of the pixel array, the readout circuitry including:
a line amplifier to amplify the image data and having an input coupled to the bit line and an output; and
a first and second sample and convert circuits coupled in parallel to the output of the line amplifier to reciprocally sample the image data and convert the image data from analog values to digital values,
wherein the first sample and convert circuit is configured to contemporaneously sample first image data while the second sample and convert circuit converts second image data and the second sample and convert circuit is configured to contemporaneously sample third image data while the first sample and convert circuit converts the first image data,
wherein the line of the pixel array comprises a given column and the line amplifier comprises a column amplifier, wherein each of the first and second sample and convert circuits includes:
a sampling switch having a first terminal coupled to the output of the column amplifier and a second terminal coupled to a sampling node;
a sampling capacitor coupled to the sampling node to sample and hold the image data;
and a column analog-to-digital converter ("ADC") coupled to the sampling node, wherein each of the first and second sample and convert circuits includes:
a pre-charge circuit coupled to the sampling node to pre-charge the sampling node to a fixed voltage, the pre-charge circuit coupled to control logic to selectively pre-charge the sampling node before each sampling period.

* * * * *